United States Patent [19]

Hayashi

[11] Patent Number: 5,101,496
[45] Date of Patent: Mar. 31, 1992

[54] PRINTER INTERFACE SYSTEM WHICH SELECTIVELY RECEIVES HORIZONTAL SYNC SIGNAL AND DOT CLOCK SIGNALS FROM PLURAL PRINTING IMAGE DATA

[75] Inventor: Yasushi Hayashi, Kawasaki, Japan

[73] Assignee: Kabushiki Kaisha Toshiba, Kawasaki, Japan

[21] Appl. No.: 299,193

[22] Filed: Jan. 19, 1989

[30] Foreign Application Priority Data

Jan. 23, 1988 [JP] Japan .................................. 63-12023

[51] Int. Cl.⁵ .................................. G06F 3/12
[52] U.S. Cl. .................................. 395/725; 364/235; 364/238.2; 364/271; 364/271.1; 364/DIG. 2
[58] Field of Search ... 364/200 MS File, 900 MS File

[56] References Cited

U.S. PATENT DOCUMENTS

| | | | |
|---|---|---|---|
| 4,004,277 | 1/1977 | Garvil | 364/200 |
| 4,183,058 | 1/1980 | Taylor | 364/900 |
| 4,207,609 | 6/1980 | Luiz | 364/200 |
| 4,339,805 | 7/1982 | Iida | 364/900 |
| 4,394,685 | 7/1983 | Yeomans | 358/296 |
| 4,410,958 | 10/1983 | Demke | 364/900 |
| 4,608,663 | 8/1986 | Gordon | 364/900 |
| 4,639,741 | 1/1987 | Inoue | 364/519 |
| 4,642,789 | 2/1987 | Lavelle | 364/900 |
| 4,644,319 | 2/1987 | Yamaguchi | 340/731 |
| 4,656,602 | 4/1987 | Berkland | 364/900 |
| 4,661,988 | 4/1987 | Shimizu | 387/65 |
| 4,680,626 | 7/1987 | Deering | 358/80 |
| 4,727,434 | 2/1988 | Kawamura | 358/448 |
| 4,800,484 | 1/1989 | Baize | 364/200 |
| 4,805,135 | 2/1989 | Ochi | 358/426 |
| 4,998,215 | 3/1991 | Black | 364/519 |
| 5,031,115 | 7/1991 | Hayashi | 364/519 |

Primary Examiner—Thomas C. Lee
Assistant Examiner—Eric Coleman
Attorney, Agent, or Firm—Finnegan, Henderson, Farabow, Garrett, and Dunner

[57] ABSTRACT

When selectors select a printer A in accordance with a printer select signal derived from a main body of a data processing system, a horizontal sync signal supplied from the printer A resets a 16-bit counter. An internal clock signal generator generates a clock signal and applies it through the selector to the counter. The counter counts the internal clock signal and produces a carry signal. In response to the carry signal, a line buffer circuit produces image data and transfers it to the printer A. When a printer B is used, the printer B sends a dot clock signal to the counter. Image data is read out from the line buffer circuit by a carry signal generated in a similar way, and is transferred to the printer A.

6 Claims, 3 Drawing Sheets

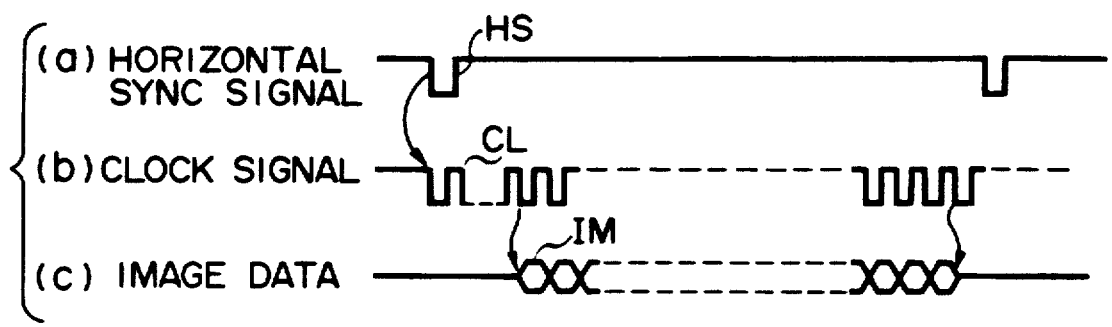
F I G. 3A
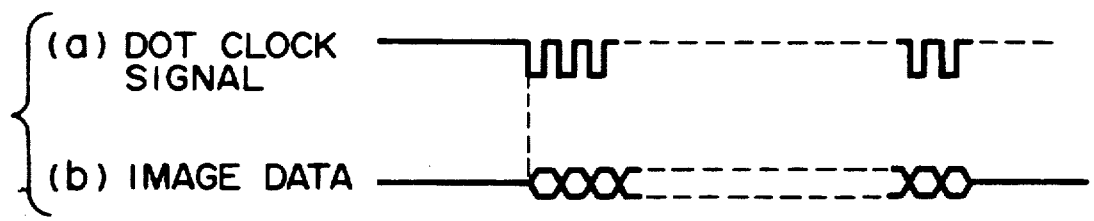
F I G. 3B

PRINTER INTERFACE SYSTEM WHICH SELECTIVELY RECEIVES HORIZONTAL SYNC SIGNAL AND DOT CLOCK SIGNALS FROM PLURAL PRINTING IMAGE DATA

BACKGROUND OF THE INVENTION

1. Field of the Invention

The present invention relates to a data processing system, such as an electronic filing system, which processes data in connection with an optical disc and prints out the processing results in the form of a hard copy by a printer.

2. Description of the Related Art

Recent offices and factories produce a tremendous amount of documents and drawings. To file those documents and drawings, an electronic filing system using an optical disc has been recently developed and put into practical use. The electronic filing system optically stores the literal and graphic information contained in documents and appropriately processes the literal and graphic data. In the filing system, the information, which are optically picked up by a scanner or read out of an optical disc, may be displayed by a CRT display or printed out by a printer. Such a system is shown in U.S. Pat. No. 4,661,988, for example.

In one type of printer, a printer generates a horizontal sync signal and sends it to a host computer (main processor in a filing system). The host computer processes image data containing literal and graphic data in synchronism with the received horizontal sync signal. The printer receives and prints out such data.

In another type of printer, a printer sends a dot clock signal to a host computer. The host computer processes the image data, and sends the processed image data to the printer. The printer receives and prints out the image data.

An electronic filing system compatible with two different types of printers as mentioned above requires two types of interfaces, one for re-synchronizing a clock signal in the host computer by a horizontal sync signal supplied from the printer and the other for a dot clock signal supplied from the printer. Alternatively, it selectively uses two types of hardware in place of the above two different interfaces. In use, one type of hardware is selected in accordance with a printer used, and matches the printer to an interface circuit contained.

As described above, the conventional electronic filing system needs two types of interfaces or hardware installed inside or outside the host computer. This indicates that the filing system is expensive.

SUMMARY OF THE INVENTION

Accordingly, an object of the present invention is to provide an inexpensive data processing system compatible with at least two different types of printers.

According to the present invention, there is provided a data processing system having a main body of the image processing system, and an interface selectively coupled between the main body and different types of printers. The interface receives data to be printed from the main body and applies the received printed data selectively to the first or second printers. The first and second printers are operated in different modes in such a way that the first printer prints out the printed data in synchronism with a horizontal sync signal supplied from the first printer per se and the second printer prints out the same in synchronism with a dot clock signal generated by the second printer per se.

In the above data processing system, the interface is comprised of: mode select means for selecting one of first and second modes in accordance with a first or second printer selectively coupled with the main body; means for generating a first clock signal in synchronism with a horizontal sync signal supplied from the first printer when the mode select means selects the first mode; means for transferring the printed data supplied from the main body to the first printer in accordance with the first clock signal; and means for transferring the printed data to the second printer in synchronism with a dot clock signal supplied from the second printer when the mode select means selects the second mode.

BRIEF DESCRIPTION OF THE DRAWINGS

FIG. 3A is a timing diagram showing the operation of the data processing system when the interface of FIG. 2 is coupled with a first printer; and FIG. 3B is a timing diagram showing the operation of the data processing system when the interface of FIG. 2 is coupled with a second printer.

DETAILED DESCRIPTION OF THE PREFERRED EMBODIMENT

A preferred embodiment of an electronic filing system according to the present invention will be described with reference to the accompanying drawings.

Figure 1:
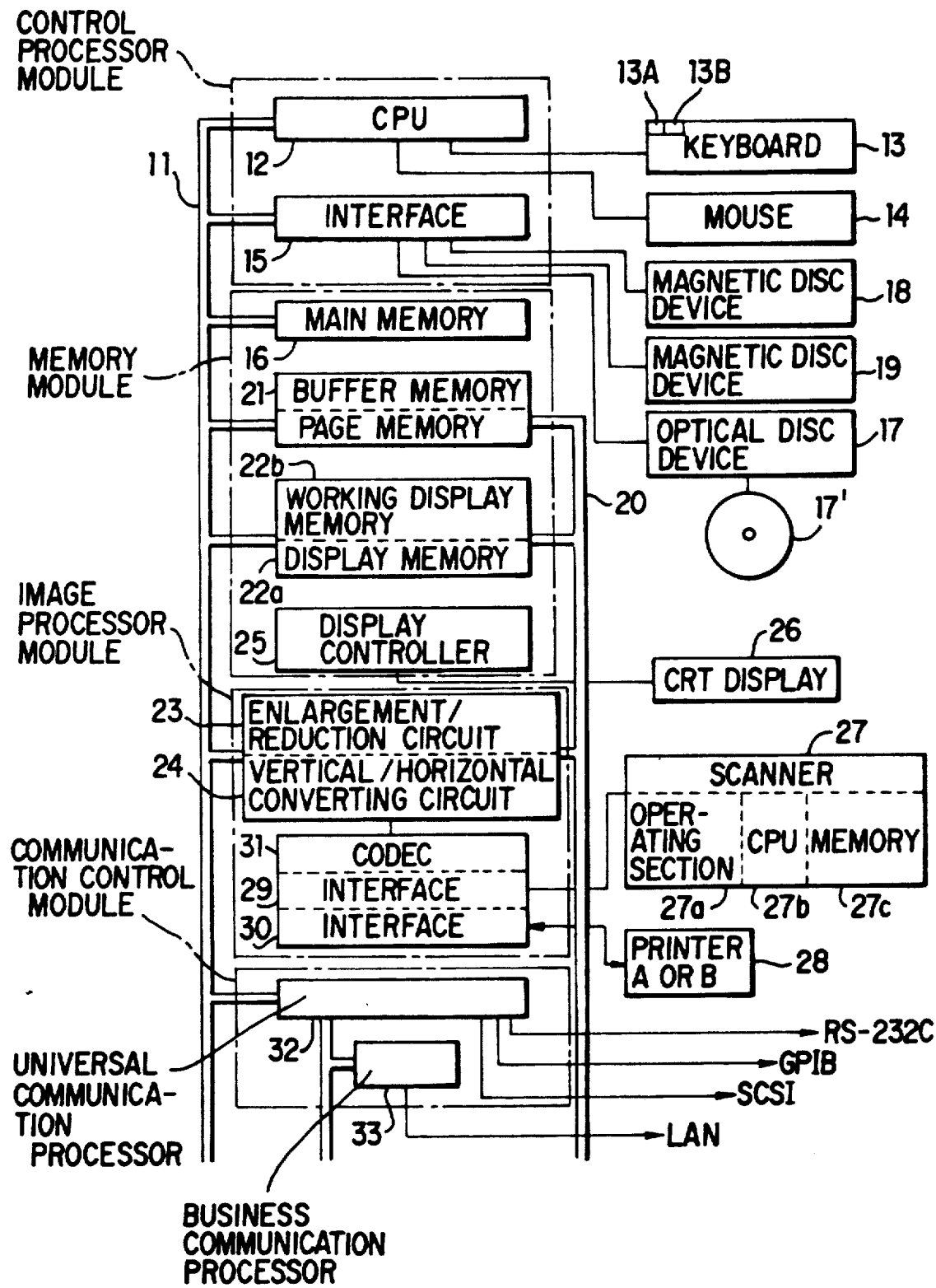
FIG. 1 is a block diagram showing a configuration of a data processing system according to a first embodiment of the present invention.

FIG. 1 shows a configuration of an electronic filing system which is an embodiment of a data processing system according to the present invention. As shown, system bus 11 is coupled with CPU 12 as a control unit. CPU 12 controls an overall system of the filing system of FIG. 1 and is operable in a multi-task mode. CPU 12 is coupled with keyboard 13 for entering various types of data including command data, and mouse 14 for moving a cursor on the screen of CRT display 26. Mouse 14 is provided with first and second buttons (not shown) for directing cursor positions, for example. Keyboard 13 is provided with keys 13A and 13B for providing an interface select signal in accordance with the type (A or B) of printer 28 coupled with interface 30 to be given later.

System bus 11 is coupled with interface 15 of a disc device and main memory 16 storing an operation program. Interface 17 is connected to optical disc device 17 for recording and reproducing image data to and from optical disc 15' or erasing the image data in the optical disc. The same is further coupled with magnetic discs 18 and 19 storing retrieval data for retrieving image data in the optical disc. Magnetic discs 18 may be respectively a floppy disc and a hard disc, for example. Inserted between system bus 11 and image bus 20 are page memory 21 partially used as a buffer memory, display memory 22a, working display memory 22b, enlargement/reduction circuit 23 for enlarging and reducing the size of an image represented by image data, and vertical/horizontal converter 24 for converting the vertical axis of an image represented by the image data to the horizontal axis of the same and vice versa, viz., rotating the image by 90°. Enlargement/reduction circuit 23 and vertical/horizontal converter 24 are assembled into a module unit. Display memory 22a is coupled with CRT display 26 through display controller 25. Scanner (two-dimensional scanner) 27 optically scans a document to pick up the pictorial information on the document, and converts them into electrical signals representing image data. Scanner 27 is coupled with operating section 27a for setting parameters (processing data) such as document size, gradation of a reproduced image, read density when a document image is read, and the like, CPU 27b for controlling the operation of scanner 27, and memory 27c for storing the parameters as set by operating section 27a.

Printer 28 prints out the image data as collected by scanner 27 or the image data read out by optical disc device 17. In this instance, printer 28 consists of printer A (first output device) operating such that it sends a horizontal sync signal to control section CPM (main body), and receives through printer interface 30 (to be given later) and prints out the image data which is processed in the main body CPM in synchronism with the horizontal sync signal, and printer B (second output device) operating such that it sends a dot clock signal to main body CPM, and receives through the same interface and prints out the image data which is processed in the main body CPM in synchronism with the dot clock signal.

Scanner 27 and printer 28 are coupled with coder/decoder (CODEC) 31 by way of interfaces 29 and 30. CODEC 31 and interfaces 29 and 30 are assembled into a module unit.

System bus 11 is coupled with universal communication processor (UCP) 32, which is an interface for RS-232C, GPIB or SCSI.

UCP 32 is coupled with business communication processor (BCP) 33 as an interface for a local area network (LAN).

CPU 12 and interface 15 constitute a control module CPM. Memory module MM is made up of main memory 16, page memory 21, display memory 22a, working display memory 22b, and display controller 25. Image processor module IPM is made up of enlargement/reduction circuit 23, vertical/horizontal converter 24, interfaces 29 and 30, and CODEC 31. Further, UCP 32 and BCP 33 make up communication control module CCM. Page memory 21 and display memory 22a are each provided with a plurality of address generators (not shown) for accessing those memories. With provision of those address generators, image data may be transferred between scanner 27 and page memory 21, and between display memory 22a and printer 28.

To enter image data from scanner 27 into the filing system, necessary parameters are set in related units by CPU 12. When scanner 27 is operated, image data is sent to page memory 21 through interface 29 and CODEC 31. In this page memory 21, a clock signal is supplied to the address generator in synchronism with this, and the address generator is counted up, and finally the image data is stored in the memory location addressed. The image data stored in this page memory 21 is transferred to display memory 22a, and through display controller 25 to CRT display 26.

To output the image data stored in display memory 22a to printer 28, one of the plurality of address generators contained in display memory 22a is driven to generate an address specifying a memory location storing the image data to be transferred to printer 28. The image data read out is then transferred to printer 28 by way of image bus 20, CODEC 31, and interface 30. Enlargement/reduction circuit and vertical/horizontal converter 24 are driven when required.

Figure 2:
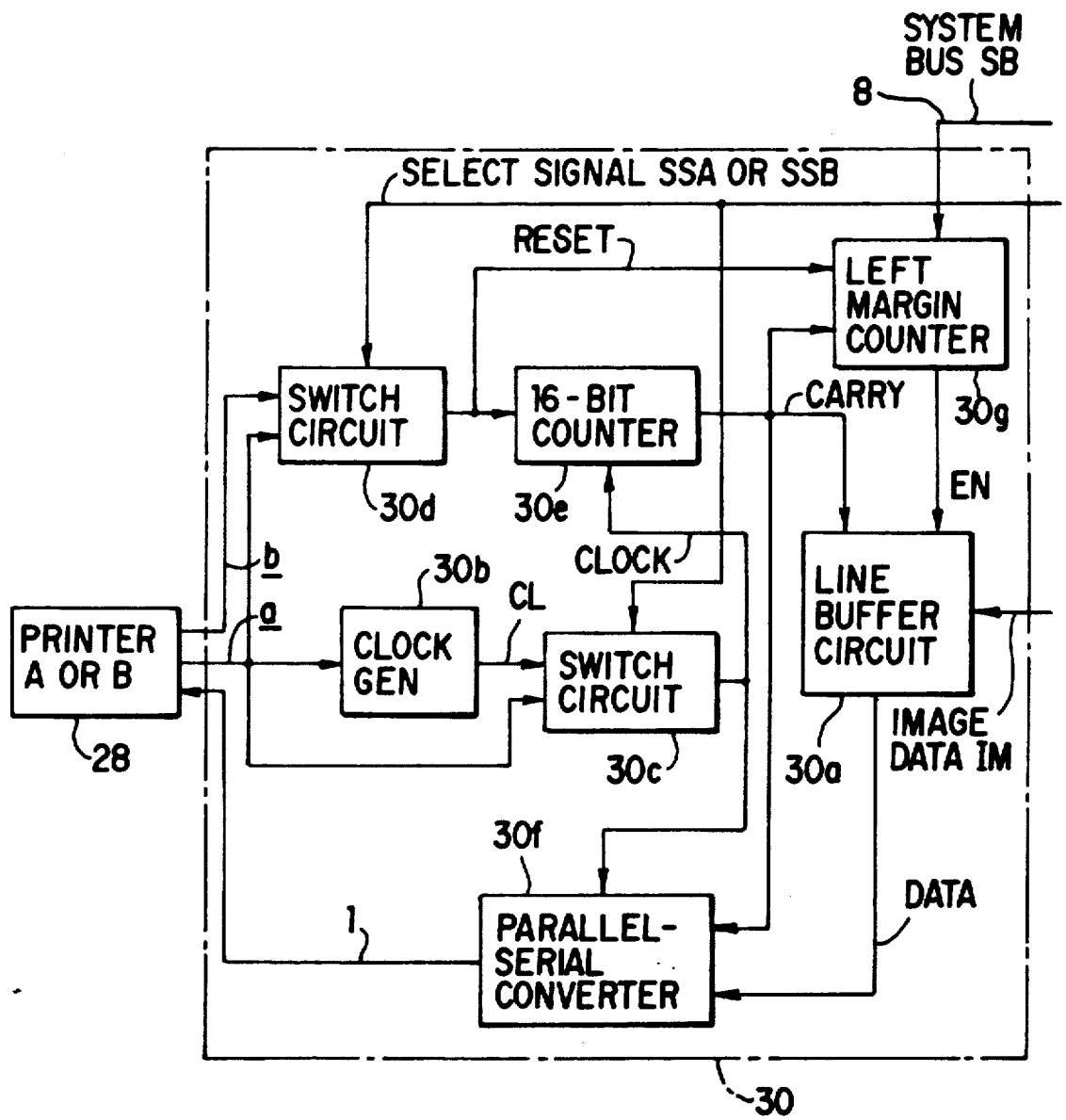
FIG. 2 is a block diagram of a printer interface used in the data processing system of FIG. 1.

Turning now to FIG. 2, there is shown a circuit configuration of interface 30. The image data IM read out from display memory 22a is transferred to interface 30 by way of image bus 20 and CODEC 31, and line buffer (video memory) 30a in interface 30. Interface signal line a from printer 28 is used by both printers A and B. When printer A is used, a horizontal line signal passes through the line. When printer B is used, a dot clock signal passes through the same line a.

A signal from printer A or a horizontal sync signal from printer B, which is delivered through line a, is applied to selector 30d as a switch circuit and through internal clock generator 30b to selector 30c as a switch circuit. A dot clock signal is supplied through signal line b to selector 30d, from printer 28. Those selectors 30c and 30d are driven by selector keys 13A or 13B on keyboard 13 which are operated by an operator in accordance with selected printer A or B. When key 13A is operated, a "1" signal is transferred from keyboard 13 to CPU 12, and through interface 15 to magnetic disc device 18 and flag "1" is set. When key 13B is operated, a "0" signal is transferred to magnetic disc device 18 and flag "0" is set.

An output terminal of selector 30d is connected to a reset input terminal of 16-bit counter 30e. A carry output terminal of counter 30e is connected to a memory read terminal of line buffer circuit 30a. A data output terminal of line buffer circuit 30a is connected to a data input terminal of parallel/serial converter 30f. An output control terminal of parallel/serial converter 30f receives the carry signal from 16-bit counter 30e and a clock terminal of counter 30p receives a clock signal from selector 30c. This clock signal is also applied to a clock terminal of 16-bit counter 30e. An output signal of circuit 30f is supplied to printer 28 which in turn prints out the received signal.

The output signal of selector 30d is also applied to a reset input terminal of left margin counter 30g. Counter 30g receives at its count data input terminal a carry as count data from 16-bit counter 30e. Counter 30g determines a left margin at the time of printing. An initial value of the counter is supplied from CPU 12 through system bus SB of 8-bit type. When printer A is used, left margin counter 30g receives from CPU 12 an initial value which depends on the size of paper used. A paper size is entered from keyboard 13 by an operator, and CPU 12 fetches the data representative of the entered paper size. The paper size can also be entered automatically when an original is picked up by a scanner. A carry from counter 30g is supplied as a memory enable signal EN to line buffer circuit 30a.

The operations of interface 30 when different printers A and B are coupled with interface 30 will be described with reference to FIGS. 3A and 3B.

The operation of the electronic filing system when printer A is used as printer 28, will be described with reference to FIG. 3A. An operator confirms that printer A is connected to interface 30, and operates key 13A on keyboard 13. Responsive to depression of the key, flag "1" is set in magnetic disc device 18. CPU 12 senses the setting of flag "1", and recognizes that printer A is now used. Therefore, a "1" select signal SS is inputted to the select input terminals of selectors 30c and 30d. Under this condition, selector 30d as a switch circuit inhibits a signal on signal line b from passing through the selector per se, while it allows a horizontal sync signal HS ((a) in FIG. 3A) supplied from printer A delivered through signal line a to pass through the selector. Another selector 30c inhibits the signal delivered through signal line a from passing the selector per se, while it allows a clock signal CL from internal clock generator 30b to pass therethrough.

Horizontal sync signal HS ((a) in FIG. 3A) is supplied to 16-bit counter 30e through selector 30d, and the counter is reset. Subsequently, at the trailing edge of the sync signal HS, the counter starts to count clock signal CL. After 16 clock pulses of clock signal CL are counted, counter 30e outputs a carry. The carry is supplied as a memory read signal to line buffer circuit 30a. The same is also supplied as a count increment signal to left margin counter 30g, so that counter 30e is counted up by one. Subsequently, left-margin counter 30g is successively incremented from a preset value as preset by CPU 12. At instant that the left margin counter counts carries from counter 30e by the number amounting to a left margin, the carry is outputted from counter 30g, and is supplied as an enable signal to line buffer circuit 30a.

The image data IM read out from page memory 21 (FIG. 1) is transferred as printed data, every 16 bits to line buffer circuit 30a. When line buffer circuit 30a receives an enable signal from left margin counter 30g, the 16-bit image data IM stored in the line buffer circuit is transferred to parallel/serial converter 30f at the trailing edge of the memory read signal from counter 30e. Image data IM is converted into serial data, and is outputted as printed data to printer A. The serial data is successively outputted from converter 30f in synchronism with a clock signal CL delivered through selector 30c. When printer A is used, in interface 30, the left margin is determined by starting the counting of internal clock signal CL at the trailing edge of the horizontal sync signal from printer A. For this reason, a signal line with high precision is used for signal line a.

The operation of the electronic filing system when printer B is selected will be described with reference to FIG. 3B. In this case, an operator pushes key 13B on keyboard 13. Flag "0" is set in magnetic disc device 18. Upon setting of flag "0", CPU 12 outputs select signal SSB to selectors 30c and 30d. Under this condition, selector 30c inhibits clock signal CL of internal clock generator 30b from passing through the selector per se, while it allows a dot clock signal ((a) in FIG. 3B) delivered through signal line a from printer B to pass through the selector. As a result, this dot clock signal is supplied as a clock signal to 16-bit counter 30e and parallel/serial converter 30f.

Selector 30d prevents dot clock signal delivered through signal line a from passing through the selector per se, while it allows a horizontal sync signal delivered through signal line b from printer B to pass through the selector. The dot clock signal outputted from printer B is applied through selector 30c to 16-bit counter 30e. In turn, counter 30e produces a carry every time it counts 16 dot clock pulses of clock signal CL, and the carry is loaded as a memory read signal to line buffer circuit 30a. When printer B is selected, the left margin is determined by image data IM per se. Because of this, CPU 12 presets a maximum value of the left margin in left margin counter 30g. Therefore, immediately after 16-bit counter 30e outputs a first carry, left margin counter 30g outputs a carry, which is applied as an enable signal to line buffer circuit 30a. At this time, the carry from counter 30e is applied as a memory read signal to line buffer circuit 30a. Therefore, image data IM of 16 bits is read out from line buffer circuit 30a in synchronism with the dot clock signal, as shown in (a) of FIG. 3B. Then, it is applied to parallel/serial converter 30f. The serial image data from circuit 30f is transferred as printed data to printer B in synchronism with the dot clock signal.

When printer B is used, image data IM is transferred to printer B in synchronism with a dot clock signal supplied from printer B, as described above. Because of this, high precision signal line a is used for transferring the dot clock signal. An accuracy of the left margin is of course dependent on an accuracy of the dot clock signal. In the case of using printer B, a high accuracy of the horizontal sync signal is not required. Therefore, signal line b may be replaced by a signal line (not shown) used for transferring a signal representing power on of printer B.

In this way, signal line a is used for transferring the horizontal sync signal from printer A and the dot clock signal from printer B as well. In other words, a single signal line a is commonly used for both the cases that printer A is connected to the interface and that printer B, to the interface. Therefore, use of a reliable signal line would provide a reliable transfer of the horizontal sync signal and the dot clock signal to the interface.

As described above, the present invention has successfully provided a data processing system such as an electronic filing system using an optical disc which is compatible with different types of printers by using a single interface, and therefore realizes a system architecture capable of making a line-up of printers at low cost.

What is claimed is:

1. An interface circuit for selectively coupling a data processing system to one of first and second printers for printing image data, comprising:
  means for storing image data processed by said data processing system;
  means for selectively receiving a horizontal synchronization signal generated by said first printer and a dot clock signal generated by said second printer in accordance with a select signal for designating one of said first and second printers connected to the interface circuit;
  first means for reading out the image data from said storing means in accordance with said horizontal synchronization signal generated by said first printer, when said first printer is connected to the interface to receive the image data, said first means including:
    clock generating means for generating clock signals in synchronism with said horizontal synchronization;
    counting means for counting said clock signals and for producing a carry signal every time a predetermined number of said clock signals is counted;
    means for supplying said carry signal as a memory read signal to said storing means; and
    means for transferring the image data stored in said storing means to said first printer in accordance with said clock signals; and
  second means for reading out the image data from said storing means in accordance with said dot clock signal generated by said second printer, when said second printer is connected to the interface instead of said first printer to receive the image data.

2. The interface according to claim 1, wherein said first means includes:
- a left margin counter in which a value based on a size of a sheet of paper being printed is preset,
- means for supplying said carry signal as count data to said left margin counter, and
- means for supplying said carry signal outputted form said left margin counter to said storing means in the form of a memory enable signal.

3. A data processing system comprising:
means for delivering image data;
a plurality of printers for printing out image data; and
an interface circuit coupled between said delivering means and a selected one of said plurality of printers for receiving image data delivered from said delivering means, said interface circuit including:
- means for storing image data delivered from said delivering means;
- means for selectively receiving a horizontal synchronization signal generated by a first printer in said plurality of printers and a dot clock signal generated by a second printer in said plurality of printers in accordance with a select signal for designating one of said first nd second printers connected to said interface circuit;
- first means for reading out image data from said storing means in accordance with a horizontal synchronization signal when said signal receiving means receives said horizontal synchronization signal, said first means including:
  - means for generating clock signals in synchronism with said horizontal synchronization signal;
  - counting means for counting said clock signals and for producing a carry signal every time a predetermined number of said clock signals is counted;
  - means for supplying said carry signal as a memory read signal to said storing means; and
  - means for transferring the image data stored in said storing means to said first printer in accordance with said clock signals; and
- second means for reading out image data from said storing means in accordance with a dot clock signal when said signal receiving means receives said dot clock signal instead of said horizontal synchronization signal.

4. The interface according to claim 3, wherein said first means includes:
- a left margin counter in which a value based on a size of a sheet of paper being printed is preset,
- means for supplying said carry signal as count data to said left margin counter, and
- means for supplying said carry signal outputted from said left margin counter to said storing means in the form of a memory enable signal.

5. A data processing system comprising:
means for receiving external image data;
a plurality of printers for printing out the image data; and
an interface circuit coupled between said receiving means and a selected one of said plurality of printers during operation of said data processing system, said interface circuit including:
- means for storing image data received at said external image data receiving means,
- means for selectively receiving a horizontal synchronization signal generated by a first printer in said plurality of printers and a dot clock signal generated by a second printer in said plurality of printers in accordance with a select signal for designating one of said first and second printers connected to said interface,
- first means for reading out the image data from said storing means in accordance with a horizontal synchronization signal when said signal receiving means receives said horizontal synchronization signal said first means including:
  - clock generating means for generating clock signals in synchronism with said horizontal synchronization signal;
  - counting means for counting said clock signals and for producing a carry signal every time a predetermined number of said clock signals is counted;
  - means for supplying said carry signal as a memory read signal to said storing means; and
  - means for transferring the image data stored in said storing means to said first printer in accordance with said clock signals; and
- second means for reading out image data from said storing means in accordance with a dot clock signal when said signal receiving means receives said dot clock signal instead of said horizontal synchronization signal.

6. The interface according to claim 5, wherein said first means includes:
- a left margin counter in which a value based on a size of a sheet of paper being printed is preset,
- means for supplying said carry signal as count data to said left margin counter, and
- means for supplying said carry signal outputted from said left margin counter to said storing means in the form of a memory enable signal.

* * * * *